(12) United States Patent
Khabashesku et al.

(10) Patent No.: US 12,233,509 B2
(45) Date of Patent: Feb. 25, 2025

(54) CUTTING ELEMENTS AND METHODS FOR FABRICATING DIAMOND COMPACTS AND CUTTING ELEMENTS WITH FUNCTIONALIZED NANOPARTICLES

(71) Applicant: Baker Hughes Holdings LLC, Houston, TX (US)

(72) Inventors: Valery N. Khabashesku, Houston, TX (US); Vladimir P. Filonenko, Moscow (RU)

(73) Assignee: Baker Hughes Company, Houston, TX (US)

( * ) Notice: Subject to any disclaimer, the term of this patent is extended or adjusted under 35 U.S.C. 154(b) by 464 days.

(21) Appl. No.: 15/905,075

(22) Filed: Feb. 26, 2018

(65) Prior Publication Data

US 2018/0185987 A1    Jul. 5, 2018

Related U.S. Application Data

(62) Division of application No. 15/005,212, filed on Jan. 25, 2016, now Pat. No. 9,931,735.

(51) Int. Cl.
*B24D 18/00* (2006.01)
*B24D 3/06* (2006.01)
(Continued)

(52) U.S. Cl.
CPC ........... *B24D 18/0009* (2013.01); *B24D 3/06* (2013.01); *C04B 35/52* (2013.01); *C04B 35/528* (2013.01);
(Continued)

(58) Field of Classification Search
CPC ...... B24D 3/06; B24D 18/0009; C04B 35/52; C04B 35/528; C04B 35/62685;
(Continued)

(56) References Cited

U.S. PATENT DOCUMENTS 6,350,191 B1    2/2002  D'Evelyn
7,820,130 B2   10/2010  Khabashesku et al.
(Continued)

OTHER PUBLICATIONS

International Search Report for International Application No. PCT/US2017/014652 mailed May 1, 2017, 3 pages.
(Continued)

*Primary Examiner* — Pegah Parvini
(74) *Attorney, Agent, or Firm* — Baker Hughes Company

(57) ABSTRACT

A method of fabricating a diamond compact includes functionalizing surfaces of diamond nanoparticles with fluorine; combining the functionalized diamond nanoparticles with a non-group-VIII metal to form a particle mixture; and subjecting the particle mixture to high pressure and high temperature (HPHT) conditions to form inter-granular bonds between the diamond nanoparticles. A cutting element for an earth-boring tool includes a plurality of grains of diamond material; a plurality of diamond nanoparticles bonded to the plurality of grains of diamond material; and a non-group-VIII metal fluoride disposed within interstitial spaces between the grains of diamond material and the plurality of diamond nanoparticles. The cutting element is substantially free of a metal-solvent catalyst.

16 Claims, 8 Drawing Sheets

(51) Int. Cl.
| | |
|---|---|
| *B82Y 30/00* | (2011.01) |
| *C04B 35/52* | (2006.01) |
| *C04B 35/528* | (2006.01) |
| *C04B 35/626* | (2006.01) |
| *C04B 35/628* | (2006.01) |
| *C04B 35/63* | (2006.01) |
| *C04B 35/645* | (2006.01) |
| *E21B 10/46* | (2006.01) |

(52) U.S. Cl.
CPC .. *C04B 35/62685* (2013.01); *C04B 35/62802* (2013.01); *C04B 35/62884* (2013.01); *C04B 35/6303* (2013.01); *C04B 35/645* (2013.01); *E21B 10/46* (2013.01); *B82Y 30/00* (2013.01); *C04B 2235/40* (2013.01); *C04B 2235/401* (2013.01); *C04B 2235/402* (2013.01); *C04B 2235/407* (2013.01); *C04B 2235/408* (2013.01); *C04B 2235/427* (2013.01); *C04B 2235/445* (2013.01); *C04B 2235/5436* (2013.01); *C04B 2235/5454* (2013.01); *C04B 2235/5472* (2013.01); *C04B 2235/66* (2013.01); *C04B 2235/80* (2013.01); *Y10S 977/773* (2013.01)

(58) Field of Classification Search
CPC ........ C04B 35/62802; C04B 35/62884; C04B 35/6303; C04B 35/645; C04B 2235/40; C04B 2235/401; C04B 2235/402; C04B 2235/407; C04B 2235/408; C04B 2235/427; C04B 2235/445; C04B 2235/5436; C04B 2235/5454; C04B 2235/5472; C04B 2235/66; C04B 2235/80; E21B 10/46; E21B 10/00; B82Y 30/00; Y10S 977/773
See application file for complete search history.

(56) References Cited

U.S. PATENT DOCUMENTS

| | | |
|---|---|---|
| 2008/0209818 A1* | 9/2008 | Belnap .................. C22C 26/00 51/307 |
| 2012/0034464 A1 | 2/2012 | Chakraborty et al. |
| 2012/0102843 A1 | 5/2012 | Chakraborty et al. |
| 2012/0181090 A1* | 7/2012 | Qian ...................... C04B 35/52 175/428 |
| 2012/0211284 A1* | 8/2012 | DiGiovanni .......... E21B 10/567 175/428 |
| 2013/0000209 A1 | 1/2013 | Chakraborty et al. |
| 2013/0041173 A1 | 2/2013 | Linford et al. |
| 2013/0043078 A1* | 2/2013 | Qian .................... F16C 33/043 175/428 |
| 2013/0068541 A1 | 3/2013 | DiGiovanni et al. |
| 2013/0152480 A1* | 6/2013 | Eyre ...................... C22C 26/00 51/295 |
| 2014/0246250 A1 | 9/2014 | Khabashesku et al. |
| 2015/0008047 A1 | 1/2015 | DiGiovanni |
| 2015/0107163 A1 | 4/2015 | Konovalov |
| 2015/0151409 A1* | 6/2015 | Vaughn ..................... B22F 7/06 51/309 |
| 2017/0209984 A1 | 7/2017 | Khabashesku et al. |

OTHER PUBLICATIONS

International Written Opinion for International Application No. PCT/US2017/014652 mailed May 1, 2017, 8 pages.
Khabashesku, Valery N. et al. "Functionalization of Nanoscale Diamond Powder: Fluoro-, Alkyl-, Amino-, and Amino Acid-Nanodiamond Derivatives" Chem. Mater. 16 (2004) pp. 3924-3930.
Khabashesku, V.N. et al. "Functionalized carbon nanotubes and nanodiamonds for engineering and biomedical applications" Diamond & Related Materials 14 (2005) pp. 859-866.
Khabashesku, V.N. "Covalent functionalization of carbon nanotubes: synthesis, properties and applications of fluorinated derivatives" Russian Chemical Reviews 80 (8) (2011) pp. 705-725.
Underwood, Ervin E., Quantitative Stereology, Addison Wesley Publishing Company, Inc., (1970), pp. 80-109.

* cited by examiner

CUTTING ELEMENTS AND METHODS FOR FABRICATING DIAMOND COMPACTS AND CUTTING ELEMENTS WITH FUNCTIONALIZED NANOPARTICLES

CROSS-REFERENCE TO RELATED APPLICATION

This Application is a divisional of U.S. patent application Ser. No. 15/005,212 filed Jan. 25, 2016, now U.S. Pat. No. 9,931,735, issued on Apr. 3, 2018, the disclosure of which is hereby incorporated herein in its entirety by this reference.

FIELD

Embodiments of the present disclosure relate generally to methods of forming polycrystalline diamond material, cutting elements and methods of forming cutting elements including polycrystalline diamond material, and green bodies that may be used to form such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements fixedly attached to a bit body of the drill bit. Similarly, roller cone earth-boring rotary drill bits include cones mounted on bearing pins extending from legs of a bit body such that each cone is capable of rotating about the bearing pin on which the cone is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as "high pressure, high temperature" (or "HPHT") processes. The cutting element substrate may be a cermet material (i.e., a ceramic-metal composite material) such as cobalt-cemented tungsten carbide. In such instances, the cobalt or other catalyst material in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Cobalt, which is commonly used in sintering processes to form PCD material, melts at about 1,495° C. The melting temperature may be reduced by alloying cobalt with carbon or another element, so HPHT sintering of cobalt-containing bodies may be performed at temperatures above about 1,450° C.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation. Polycrystalline diamond cutting elements in which the catalyst material remains in the diamond table are generally thermally stable up to temperatures of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within a diamond table including cobalt, eventually leading to deterioration of the diamond table and ineffectiveness of the cutting element. Furthermore, at temperatures commonly encountered during drilling operations, catalyst material in a diamond table may catalyze diamond transformation back to graphite (which may be referred to in the art as "back-graphitization").

To reduce the problems associated with different rates of thermal expansion and back-graphitization in polycrystalline diamond cutting elements, so-called "thermally stable" polycrystalline diamond (TSD) cutting elements have been developed. Such a thermally stable polycrystalline diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1,200° C. It has also been reported, however, that fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments, a method of fabricating a diamond compact includes functionalizing surfaces of diamond nanoparticles with fluorine, combining the functionalized diamond nanoparticles with a non-group-VIII metal to form a particle mixture, and subjecting the particle mixture to high pressure and high temperature (HPHT) conditions to form inter-granular bonds between the diamond nanoparticles.

A method of forming a cutting element for an earth-boring tool includes functionalizing surfaces of diamond nanoparticles with fluorine, combining the functionalized diamond nanoparticles with a non-group-VIII metal to form a particle mixture, providing the particle mixture over a body, and subjecting the particle mixture and the body to high pressure and high temperature (HPHT) conditions to form inter-granular bonds between the diamond nanoparticles and secure the inter-granular bonded diamond nanoparticles to the body.

A cutting element for an earth-boring tool includes a plurality of grains of diamond material, a plurality of diamond nanoparticles bonded to the plurality of grains of diamond material, and a non-group-VIII metal fluoride disposed within interstitial spaces between the grains of diamond material and the plurality of diamond nanoparticles. The cutting element is substantially free of a metal-solvent catalyst.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
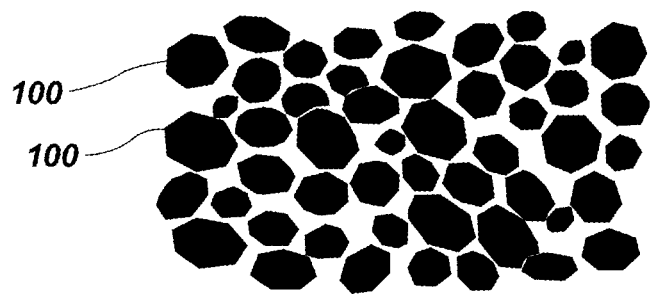
FIG. 1 is a simplified view illustrating diamond nanoparticles.

The illustrations presented herein are not meant to be actual views of any particular material, apparatus, system, or method, but are merely idealized representations employed to describe certain embodiments. For clarity in description, various features and elements common among the embodiments may be referenced with the same or similar reference numerals.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., ionic, covalent, metallic, etc.) between atoms in adjacent grains of material.

As used herein, the term "grain size" means and includes a geometric mean diameter measured from a two-dimensional section through a bulk material. The geometric mean diameter for a group of particles may be determined using techniques known in the art, such as those set forth in Ervin E. Underwood, QUANTITATIVE STEREOLOGY, 103-105 (Addison-Wesley Publishing Company, Inc., 1970), the disclosure of which is incorporated herein in its entirety by this reference.

FIG. 1 is a simplified view illustrating diamond nanoparticles 100. The diamond nanoparticles 100 may be formed by milling or crushing diamond particles (e.g., micron-sized natural or synthetic diamond) into smaller particles. Alternatively, the diamond nanoparticles 100 may be formed by other means, such as by detonation processes.

The diamond nanoparticles 100 may have any selected size distribution, which may be monomodal or multimodal (bimodal, trimodal, etc.). The diamond nanoparticles 100 may have a mean diameter from about 5 nm (nanometer) to about 1,000 nm, from about 10 nm to about 500 nm, or from about 20 nm to about 200 nm. In some embodiments, the diamond nanoparticles 100 may have a mean diameter of about 90 nm. Such diamond nanoparticles 100 may be substantially free of oxygen. In some embodiments, the diamond nanoparticles 100 may include substantially pure carbon, which may, in HPHT processes, tend to form polycrystalline diamond having relatively more uniform properties than diamond nanoparticles having significant amounts of impurities.

Figure 2:
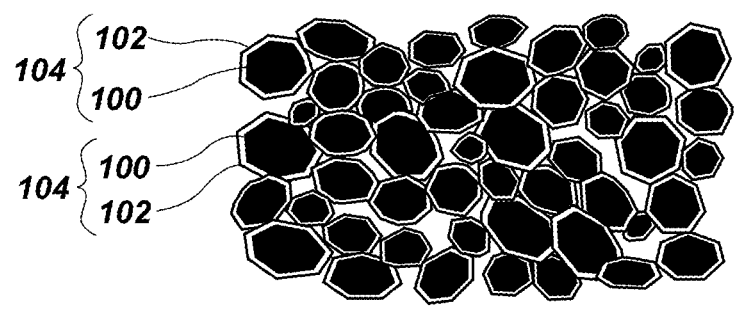
FIG. 2 is a simplified view illustrating the diamond nanoparticles of FIG. 1 after functionalization with fluorine.

The diamond nanoparticles 100 may be functionalized with fluorine. FIG. 2 is a simplified view illustrating functionalized diamond nanoparticles 104. The functionalized diamond nanoparticles 104 include a fluorine coating 102 over at least a portion of the diamond nanoparticles 100.

The fluorine coating 102 may be formed by contacting the diamond nanoparticles 100 with fluorine gas ($F_2$) at elevated temperatures (e.g., from about 50° C. to about 500° C.), as described in U.S. Pat. No. 7,820,130, issued Oct. 26, 2010, titled "Functionalization of Nanodiamond Powder Through Fluorination and Subsequent Derivatization Reactions," the entire disclosure of which is hereby incorporated by reference. The fluorine atoms of the fluorine coating 102 may be covalently bonded to carbon atoms of the diamond nanoparticles 100. The fluorine coating 102 may be a monolayer over the diamond nanoparticles 100. The amount of fluorine in the functionalized diamond nanoparticles 104 may be a function of the mean diameter of the diamond nanoparticles 100. For example, if the fluorine coating 102 has a given thickness (e.g., one monolayer), smaller functionalized diamond nanoparticles 104 will have a higher concentration of fluorine than larger functionalized diamond nanoparticles 104. The functionalized diamond nanoparticles 104 may include, for example, from about 0.1% to about 20% fluorine by weight, such as from about 0.5% to about 10% fluorine by weight. In some embodiments, the functionalized diamond nanoparticles 104 may include about 5% fluorine by weight.

Figure 3:
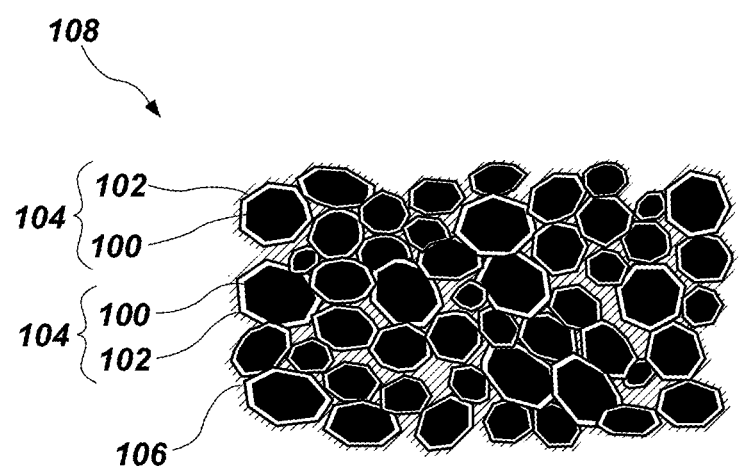
FIG. 3 is a simplified view illustrating the functionalized diamond nanoparticles of FIG. 2 mixed with a metal.

As shown in FIG. 3, the functionalized diamond nanoparticles 104 may be combined with a metal 106 to form a mixture 108, such that, upon sintering, the metal 106 promotes the formation of inter-granular diamond-to-diamond bonds. The metal 106 may be a non-group-VIII metal, and may include a material such as aluminum, copper, silver, indium, zinc, lead, lithium, sodium, potassium, rubidium, cesium, magnesium, calcium, strontium, or barium. The metal 106 may be selected to be a metal that does not function as a metal solvent catalyst in the formation of diamond-to-diamond bonds, at least in the absence of fluorine. The metal 106 may be selected to have a melting temperature below a temperature used in an HPHT process and a vaporization temperature above the HPHT sintering temperature. Thus, during subsequent sintering, the metal 106 may initiate surface reactions between the functionalized diamond nanoparticles 104 without itself being vaporized. The metal 106 may also include other elements that do not tend to interfere with the formation of diamond-to-diamond bonds, such as silicon, germanium, or tin.

In some embodiments, the mixture 108 may include from about 0.1% to about 50% metal 106 by weight (i.e., from about 50% to about 99.9% functionalized diamond nanoparticles 104 by weight). For example, the mixture 108 may include from about 0.5% to about 20% metal 106 by weight (i.e., from about 80% to about 99.5% functionalized diamond nanoparticles 104 by weight), or about 1.0% to about 10% metal 106 by weight (i.e., from about 90% to about 99% functionalized diamond nanoparticles 104 by weight). The amount of the metal 106 mixed with the functionalized diamond nanoparticles 104 may be selected to have a volume approximately equal to the volume of interstitial spaces between the functionalized diamond nanoparticles 104, such that the metal 106 approximately fills the interstitial spaces. For example, the volume of the metal 106 may be from about 50% to about 150% of the volume of the interstitial spaces of the functionalized diamond nanoparticles 104 before mixing, or from about 90% to about 110% of the volume of the interstitial spaces.

The metal 106 may be mixed with the functionalized diamond nanoparticles 104 in the presence of a solvent. For example, the functionalized diamond nanoparticles 104 and the metal 106 may be dispersed in a solvent such as dry hexane, cyclohexane, heptane, benzene, toluene, etc., or a combination of such solvents. The solvent may be selected to be unreactive toward both the functionalized diamond nanoparticles 104 and the metal 106, such that the functionalized diamond nanoparticles 104 and the metal 106 are physically and chemically unchanged, other than dispersion in the solvent. Once the functionalized diamond nanoparticles 104 and the metal 106 are dispersed in the solvent, the solvent may be removed, such as by evaporation, to leave the mixture 108 behind. In some embodiments, the mixture 108 may be heated to substantially remove any remaining solvent.

The mixture 108 may be subsequently formed into a cohesive solid, such as by extrusion, pressing, molding (e.g., injection molding), spray drying, spin coating, hot or cold rolling, tape casting, etc. The mixture 108 may then be an unsintered body, but may nonetheless retain its shape. The fluorine coating 102 can reduce inter-particle friction between the functionalized diamond nanoparticles 104. Thus, the mixture 108 may become relatively more dense than mixtures conventionally used in forming polycrystalline diamond.

In some embodiments, the metal 106 may be a powder or pelletized material, which may be mechanically mixed (e.g., dry, without any solvent) with the functionalized diamond nanoparticles 104. In some embodiments, the metal 106 and the functionalized diamond nanoparticles 104 may be commingled powders.

Figure 4:
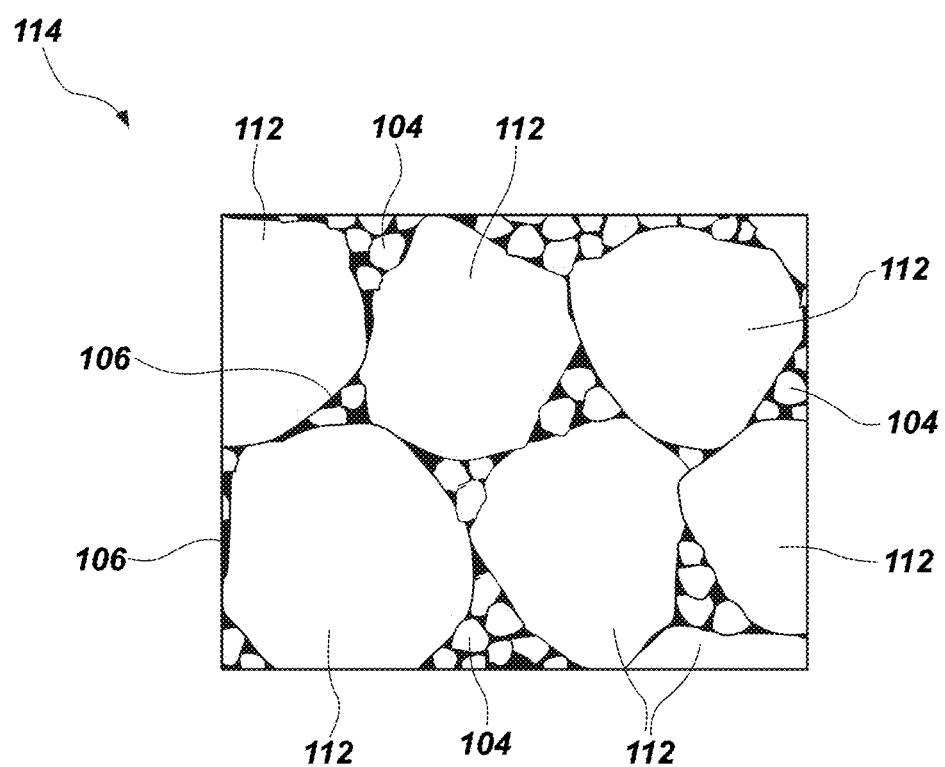
FIG. 4 is a simplified view illustrating the functionalized diamond nanoparticles and metal of FIG. 3 mixed with diamond grit.

FIG. 4 is a simplified view illustrating the functionalized diamond nanoparticles 104 and metal 106 of FIG. 3 mixed with diamond grit. As shown in FIG. 4, the mixture 108 of FIG. 3 may be mixed or interspersed with relatively larger diamond particles 112 (e.g., diamond "grit") to form a second mixture 114. For example, the relatively larger diamond particles 112 may have an average diameter of at least 1 µm, at least 5 µm, or even at least 10 µm. Alternatively, the functionalized diamond nanoparticles 104 may be mixed with the larger diamond particles 112 before adding the metal 106. In some embodiments, the functionalized diamond nanoparticles 104, the metal 106, and the larger diamond particles 112 may be mixed in a single operation. Thus, the second mixture 114 may include the functionalized diamond nanoparticles 104, the metal 106, and the larger diamond particles 112. The larger diamond particles 112 may also be functionalized as described above.

As shown in FIG. 4, the second mixture 114 may include interspersed larger diamond particles 112 that form a three-dimensional network of diamond material. The larger diamond particles 112 may have average particle dimensions (e.g., mean diameters) of less than 1 mm, less than 0.1 mm, less than 0.01 mm, less than 1 µm, or even less than 0.1 µm. That is, the larger diamond particles 112 may include micron diamond particles (e.g., diamond grains in a range from about 1 µm to about 500 µm (0.5 mm)), submicron diamond particles (e.g., diamond grains in a range from about 500 nm (0.5 µm) to about 1 µm), and/or diamond nanoparticles (e.g., particles having an average particle diameter of about 500 nm or less). The larger diamond particles 112 may have a monomodal or multimodal grain size distribution.

In some embodiments, the mixture 108, shown in FIG. 3, or the second mixture 114, shown in FIG. 4 may be combined in one or more layers in a canister. Optionally, the canister also may contain a body in the form of a substrate. For example, the substrate may include a generally cylindrical body of cobalt-cemented tungsten carbide material, although substrates of different geometries and compositions also may be employed. The mixtures 108, 114 may be subjected to HPHT conditions to form polycrystalline diamond. In additional embodiments, the mixtures 108, 114 may be placed in a canister for sintering without any substrate.

A composite mixture may be formed by stacking or layering portions of mixtures 108, 114 described herein, such as by layering sheets or other volumes on a supporting surface, which may in some embodiments comprise a body in the form of a substrate. The portions of mixtures may each have the same composition, or the composition of various portions may be selected to provide any selected grain configuration. For example, an interior region may have particles with a different size distribution than an exterior region. In some embodiments, the mixture may be a single mass of material, without distinct layers.

Figure 5:
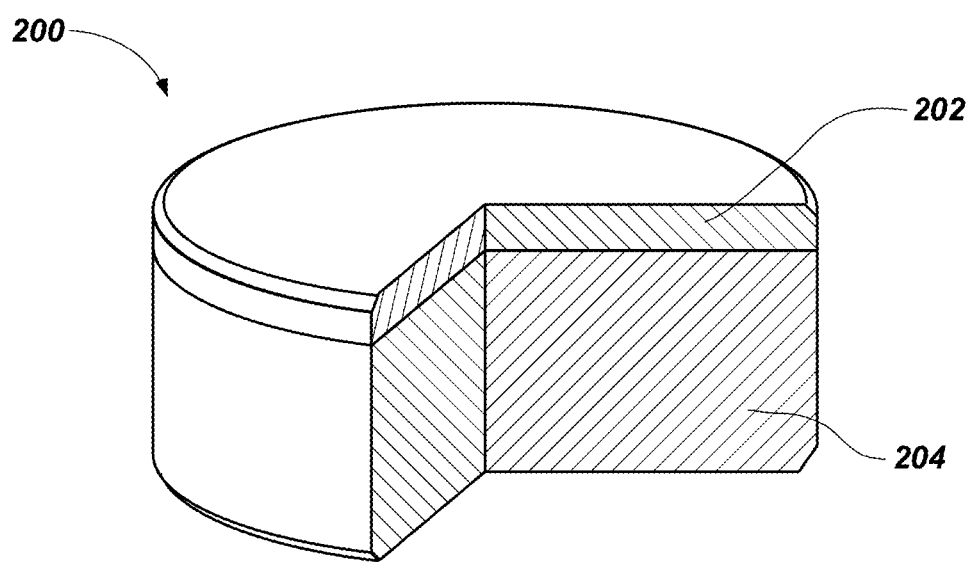
FIG. 5 is a partially cut-away perspective view of a cutting element formed by subjecting the mixture of FIG. 4 to an HPHT sintering process.

The mixtures 108 (FIG. 3) or 114 (FIG. 4) may be sintered at HPHT conditions (e.g., temperatures greater than about 900° C. and pressures greater than about 5.0 GPa) to form inter-granular bonds between adjacent functionalized diamond nanoparticles 104 or between the larger diamond particles 112 and the functionalized diamond nanoparticles 104. The sintering process may cause physical and chemical changes to form polycrystalline diamond 202, as shown in FIG. 5. The mixtures 108 or 114 may be sintered at a temperature higher than a melting point of the metal 106.

For example, the mixtures 108 or 114 may be sintered at a temperature of at least about 1,200° C., at least about 1,400° C., at least about 1,600° C., or even at least about 1,800° C. The mixtures 108 or 114 may be sintered at a pressure of less than about 8.0 GPa, less than about 7.5 GPa, less than about 7.0 GPa, or even less than about 6.5 GPa. The mixtures 108 or 114 may be sintered at a pressure from about 2.0 GPa to about 8.0 GPa, from about 4.0 GPa to about 7.5 GPa, from about 5.0 GPa to about 7.0 GPa, or from about 5.5 GPa to about 6.5 GPa.

The fluorine coating 102 (FIG. 2) can reduce inter-particle friction between the functionalized diamond nanoparticles 104, and enhance the ability of the functionalized diamond nanoparticles 104 to rotate during sintering, which may lead to relatively more dense polycrystalline diamond. For example, polycrystalline diamond formed from fluorine-coated particles may have a diamond content of at least about 96% by volume, at least about 97% by volume, or even at least about 98% by volume. A chemical reaction may occur between the metal 106 and the fluorine atoms of the functionalized diamond nanoparticles 104. The carbon exposed by such reactions may form diamond-to-diamond bonds.

For example, if the metal 106 includes aluminum, the aluminum may react with the fluoride as follows:

$$Al + C_{diamond}F \xrightarrow{600°\ C.} AlF_3 + C_{diamond}C_{diamond}.$$

In the resulting polycrystalline diamond, pores of the polycrystalline diamond 202 may contain aluminum fluoride, which may be inert and relatively stable at conditions commonly encountered in drilling operations. The polycrystalline diamond 202 may be suitable for use in a drilling tool without leaching because the aluminum fluoride present in interstitial spaces may not be catalytic to the formation or decomposition of diamond-to-diamond bonds. Furthermore, because the polycrystalline diamond 202 may be formed without a metal-solvent catalyst, the polycrystalline diamond 202 may be more resistant to degradation during use, even without leaching the polycrystalline diamond 202, than conventional polycrystalline diamond.

As shown in FIG. 5, the polycrystalline diamond 202 may, optionally, be bonded to a substrate 204 to form a cutting element 200. For example, the substrate 204 may include a generally cylindrical body of cobalt-cemented tungsten carbide material, although substrates of different geometries and compositions also may be employed. The polycrystalline diamond 202 may be in the form of a table (i.e., a layer) of polycrystalline diamond 202 on the substrate 204. The polycrystalline diamond 202 may be provided on (e.g., formed on or secured to) a surface of the substrate 204. In additional embodiments, the cutting element 200 may simply comprise a volume of the polycrystalline diamond 202 having any desirable shape, and may not include any substrate 204. In contrast to conventional cutting elements, cobalt from the substrate 204 (if present) may not sweep through the polycrystalline diamond 202 in any appreciable amounts because the interstitial spaces between diamond grains may be already occupied by the metal fluoride.

The use of diamond nanoparticles 100 (FIG. 1) to form cutting elements 200 may result in polycrystalline diamond 202 having diamond nanoparticles 100 remaining after HPHT processing. The diamond nanoparticles 100 of the polycrystalline diamond 202 may increase the overall density and abrasion resistance of the polycrystalline diamond 202. Because crushing may form diamond nanoparticles having relatively lower concentrations of non-diamond carbon than other methods of forming diamond nanoparticles, the resulting polycrystalline diamond 202 may be relatively more pure than polycrystalline hard materials formed from other types of diamond nanoparticles (e.g., detonation nanodiamond tends to include polycrystalline nanodiamond agglomerates and non-diamond carbon). During the formation of polycrystalline diamond 202 from diamond nanoparticles 100, dissolution of diamond (including the diamond nanoparticles 100) in a binder may occur at a lower rate than in conventional processes. Thus, polycrystalline diamond 202 formed from diamond nanoparticles 100 may have more diamond nanoparticles 100 remaining after HPHT processing than similar polycrystalline hard materials formed from similar amounts of other types of diamond nanoparticles. Furthermore, the diamond nanoparticles 100 remaining after HPHT processing may be closer to the size of the diamond nanoparticles 100 than would be expected when other types of diamond nanoparticles are used.

The metal 106 may promote bonding at temperatures or pressures lower than temperatures and pressures used in conventional HPHT processes that use a metal-solvent catalyst material (e.g., a group-VIII metal). For example, a mixture containing the metal 106 may be sintered at temperatures from about 1,400° C. to about 1,700° C. In some embodiments, the mixture may be sintered at a temperature from about 1,300° C. to about 1,450° C. or from about 1,200° C. to about 1,350° C. During the HPHT process, pressure may be applied to the mixture 108 (FIG. 3) or 114 (FIG. 4), such as a pressure of at least about 5.0 GPa, at least about 6.0 GPa, at least about 8.0 GPa, or at least about 9.0 GPa. Process conditions (e.g., sintering temperature, pressure, ramp rate, hold times, etc.) may be selected based on the type and amount of the metal 106, as well as other factors such as particle size, overall body dimensions, etc.

Embodiments of cutting elements 200 (FIG. 5) that include polycrystalline diamond 202 fabricated as described herein may be mounted to earth-boring tools and used to remove subterranean formation material. Cutting elements 200 may include residual fluorine (e.g., in the form of aluminum fluoride or another metal fluoride) from the HPHT process.

Figure 6:
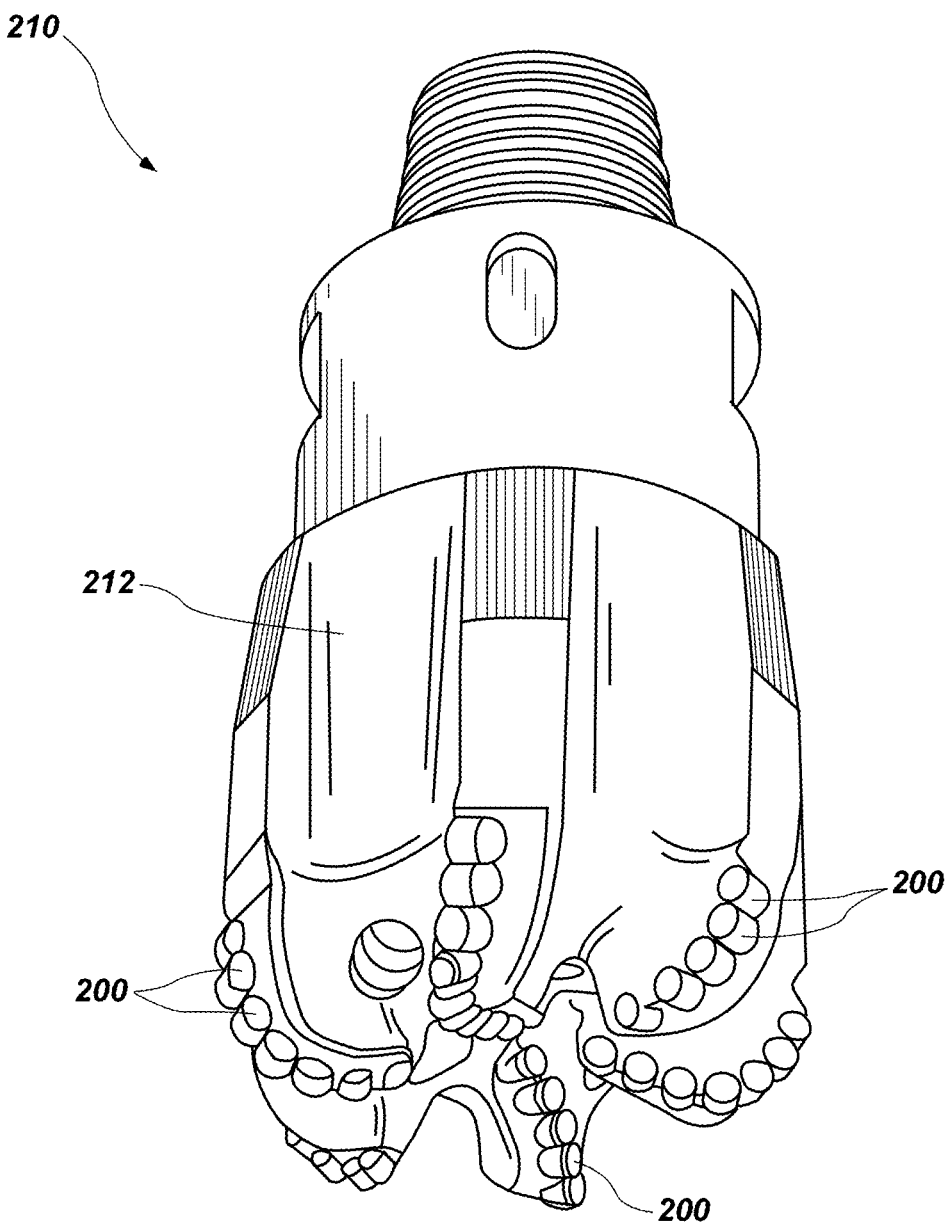
FIG. 6 illustrates a fixed-cutter earth-boring rotary drill bit including polycrystalline diamond cutting elements, such as the cutting element shown in FIG. 5.

FIG. 6 illustrates a fixed-cutter earth-boring rotary drill bit 210. The drill bit 210 includes a bit body 212. A plurality of cutting elements 200 as described herein may be mounted on the bit body 212 of the drill bit 210. The cutting elements 200 may be brazed or otherwise secured within pockets formed in the outer surface of the bit body 212, the method of attachment being somewhat related to whether or not a substrate 204 is present. Other types of earth-boring tools, such as roller-cone bits, percussion bits, hybrid bits, reamers, etc., also may include cutting elements 200 as described herein.

Polycrystalline diamond formed by methods described herein may be thermally stable even without any subsequent leaching, and may exhibit relatively high abrasion resistance (i.e., wear resistance) and thermal stability as compared to conventional unleached polycrystalline diamond. That is, the methods disclosed may form a thermally stable product (TSP) without the need for leaching catalyst material. Furthermore, forming polycrystalline diamond from mixtures with metals as disclosed herein may be less labor- and energy-intensive than conventional processes (e.g., the sintering may be performed at lower temperatures and pressures, and leaching may be avoided altogether), may form larger diamond grains in the polycrystalline diamond, and may form a larger number of diamond-to-diamond bonds than conventional processes. With these process changes, the polycrystalline diamond formed may be robust enough for drilling operations, having a durability and abrasion resistance comparable to leached cutters. Furthermore, because an entire polycrystalline diamond table may be formed in such a manner, the material may wear more consistently and provide a longer effective cutting life (e.g., because there may not be an underlying layer of material having a group-VIII catalyst that would be exposed as the cutter wears). Thus, cutting elements formed as disclosed herein may reduce the cost of drilling operations and increase the economic production capabilities of subterranean formations.

EXAMPLES

Example 1

HPHT Sintering of Non-Fluorinated Crushed Nanodiamond

Figure 7:
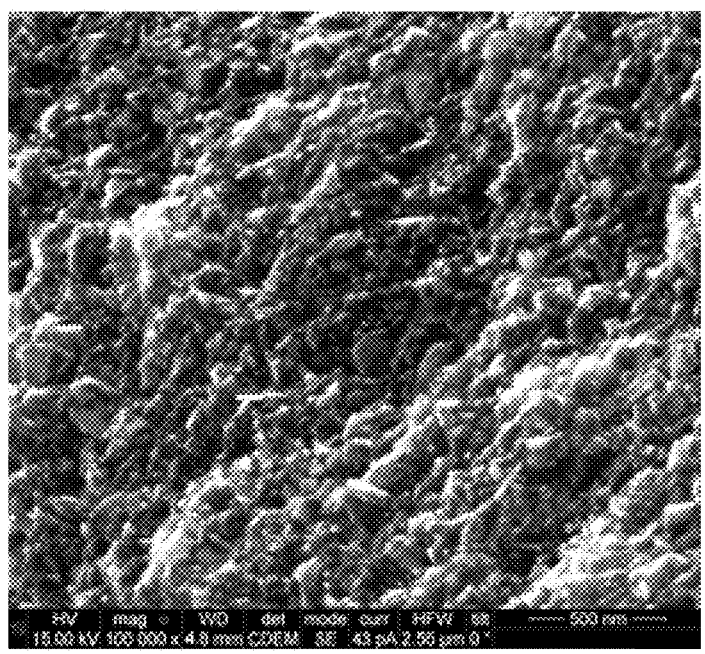
FIGS. 7 and 8 are scanning electron microscopy (SEM) images depicting microstructures of sintered diamond material.

A sample of crushed nanodiamond (i.e., diamond nanoparticles) having a mean particle diameter of 90 nm was obtained from NanoDiamond Products, Ltd., of Shannon, Ireland. The crushed nanodiamond was mechanically mixed (i.e., as dry powders) with submicron aluminum powder having a mean particle diameter of 800 nm, which was obtained from US Research Nanomaterials, Inc., of Houston, Texas. The mixture was approximately 85% crushed nanodiamond and 15% aluminum. The crushed nanodiamond and aluminum were subjected to HPHT sintering at a maximum pressure of 8.0 GPa and a maximum temperature of about 1,600° C., for about 20 seconds. The microstructure of the polycrystalline diamond material was photographed by SEM, and is depicted in FIG. 7.

Example 2

HPHT Sintering of Fluorinated Crushed Nanodiamond

A sample of crushed nanodiamond having a mean particle diameter of 90 nm was obtained from NanoDiamond Products, Ltd. The crushed nanodiamond was coated with fluorine to form covalent C—F bonds on surfaces of the nanodiamond by exposing the crushed nanodiamond to fluorine gas ($F_2$) at a temperature of 340° C. for 300 minutes. The crushed nanodiamond was mechanically mixed (i.e., as dry powders) with submicron aluminum powder having a mean particle diameter of 800 nm, which was obtained from US Research Nanomaterials, Inc. The mixture was approximately 85% fluorinated crushed nanodiamond and 15% aluminum. The fluorinated crushed nanodiamond and aluminum were subjected to HPHT sintering at a maximum pressure of 8.0 GPa and a maximum temperature of about 1,600° C., for about 20 seconds. The microstructure of the polycrystalline diamond material was photographed by SEM, and is depicted in FIG. 8.

Figure 8:
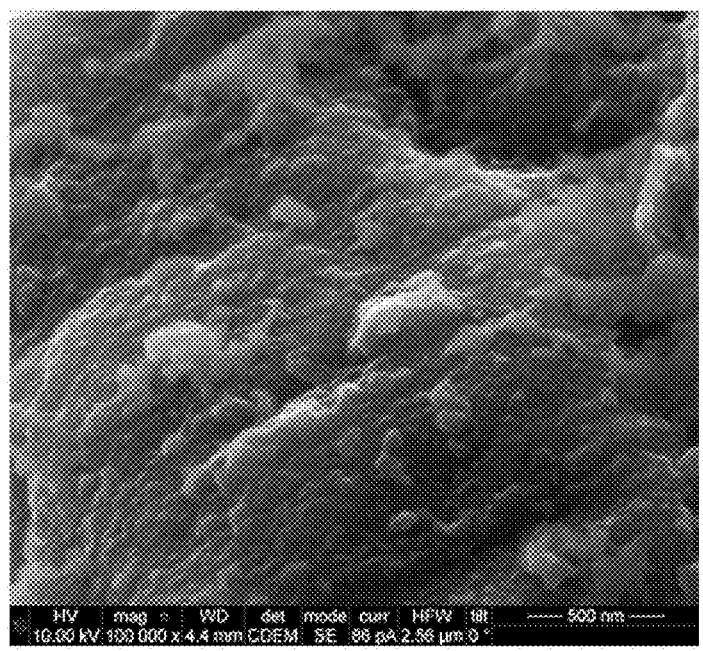

A comparison of the SEM images of FIGS. 7 and 8 illustrates the effect of fluorinating the nanodiamond before HPHT sintering. As shown in FIG. 7, the diamond crystals formed from non-fluorinated nanodiamond appear to have well-defined faces. FIG. 7 also shows flattened particles having a hexagonal shape, which may include graphite. Furthermore, aluminum is known to react with diamond in HPHT sintering to form aluminum carbide, which may provide the porous appearance of FIG. 7. In comparison, the polycrystalline diamond in FIG. 8 appears more dense, consistent, and solid. The aluminum in Example 2 may react with the covalent C—F bonds between the fluoride coating and the nanodiamond to form aluminum fluoride and diamond-to-diamond bonds. Thus, it appears that the polycrystalline diamond shown in FIG. 8 formed from fluorinated nanodiamond may be more dense and have less graphitization than the polycrystalline diamond shown in FIG. 7.

Example 3

HPHT Sintering of Fluorinated Crushed Nanodiamond for 30 Seconds

Figure 9:
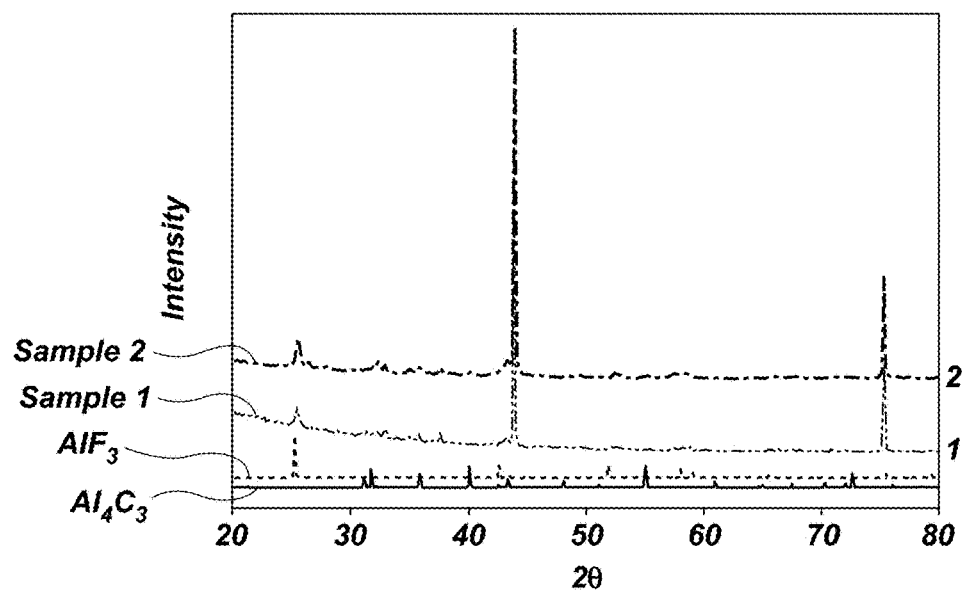
FIG. 9 is an X-ray diffraction (XRD) spectrum of a sintered diamond material.

Two samples of fluorinated crushed nanodiamond and aluminum were prepared as in Example 2. The samples were sintered together at a maximum pressure of 8.0 GPa and a maximum temperature of about 1,600° C., for about 30 seconds. The samples were tested by X-ray diffraction (XRD) to determine chemical composition, with the resulting XRD spectrum shown in FIG. 9. The peak at 2θ=25 indicates that each of the sintered samples contained aluminum fluoride ($AlF_3$). No aluminum carbide ($Al_4C_3$) was detected in these samples. The diamond peaks are narrow, indicating that the particles of diamond had uniform, near-perfect crystalline structure.

Figure 10A:
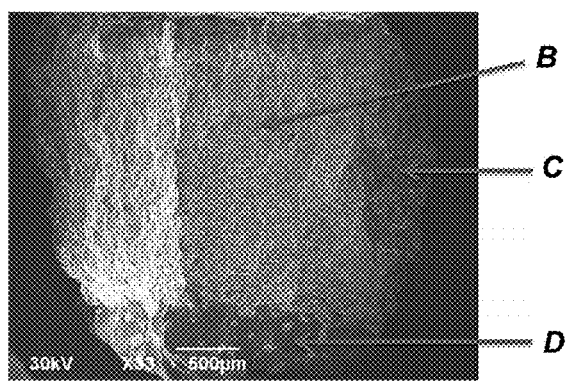
FIGS. 10A through 10D include SEM images depicting microstructures of sintered diamond material.
Figure 10B:
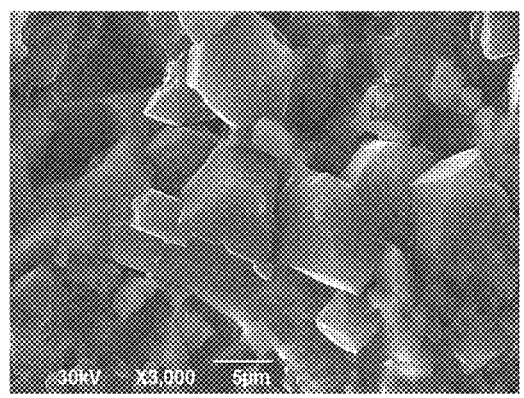
Figure 10C:
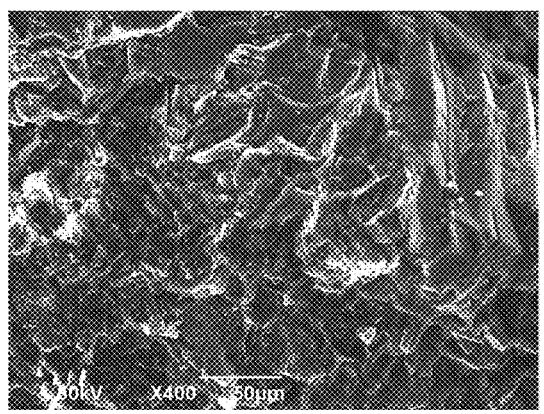
Figure 10D:
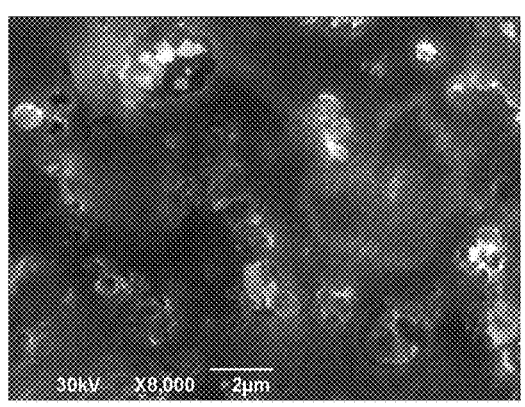

In the middle of the samples, the color of the material at the cleavage point appeared white, and included particles having micron sizes. At the ends of the sample (portions that experienced lower maximum temperatures than the middle), bright spherical zones of growth and enlargement of nanodiamonds into a micron-size crystals were observed inside a nanocrystalline diamond matrix. FIGS. 10A-10D show SEM images of the samples. FIG. 10A is a general view of the sample cleavage, and includes arrows indicating where the other images were taken. FIG. 10B shows the area of growth of nanodiamonds into micron-size diamond. FIG. 10C shows polycrystalline diamond on the side surface of the sample, formed by a graphitic heater. FIG. 10D shows growth of nanodiamond near the edge of the sample, and shows relatively smaller grains than FIG. 10B.

The diamond grains shown in FIGS. 10A-10D appear to form in large volumes without diamond graphitization. The main drawback of the process of Example 3 is that micron-sized particles do not appear to form a solid polycrystalline material.

Example 4

HPHT Sintering of Non-Fluorinated Crushed Nanodiamond for 30 Seconds

Samples were prepared as in Example 3, but with non-fluorinated crushed nanodiamond. In contrast with Example 3, large (i.e., micron sized) particles were not observed after sintering. Without being bound to any particular theory, it appears that molten aluminum dissolves nanodiamonds to form aluminum carbide. Some polycrystalline diamond growth appeared on the side surface of the composite. Thus, even without fluorine, the system C—Al appears to be catalytic to the graphite-diamond phase transition.

Example 5

Figure 11:
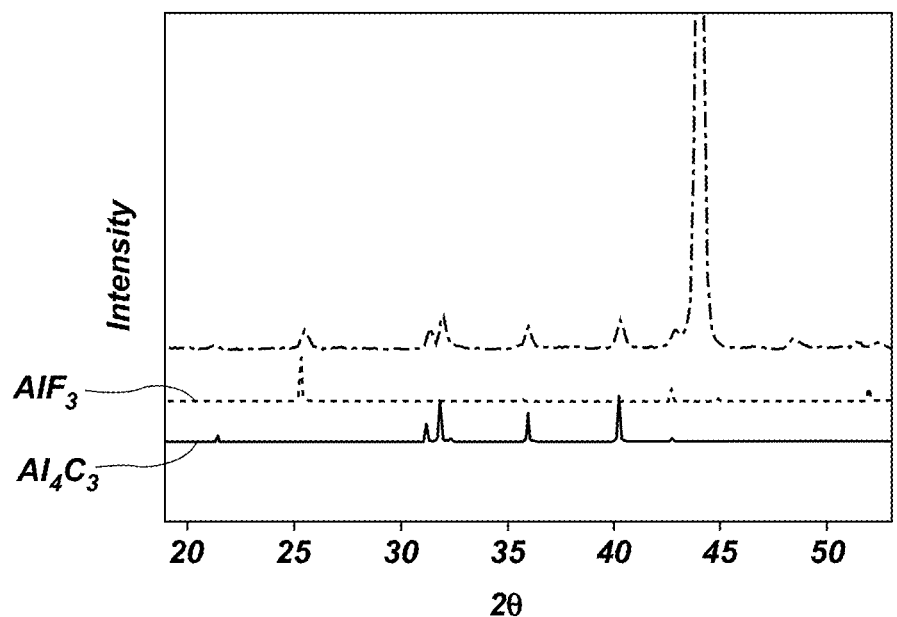
FIG. 11 is an XRD spectrum of a sintered diamond material.
Figure 12:
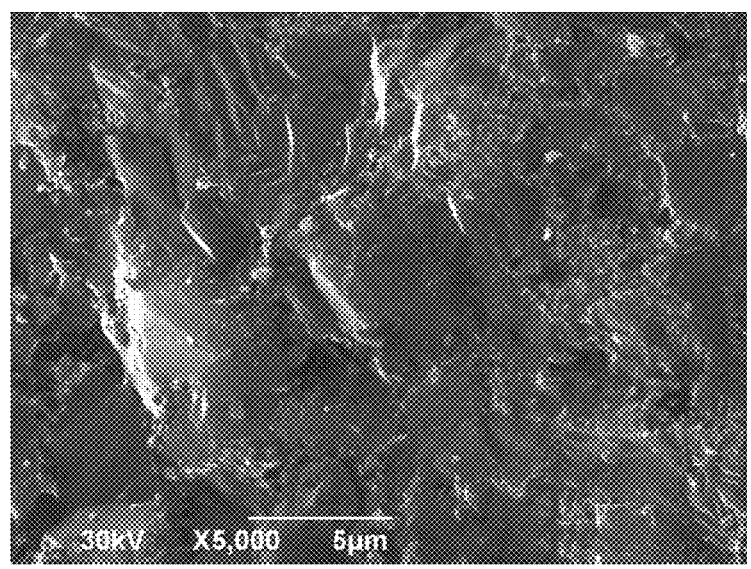
FIGS. 12 and 13 include SEM images depicting microstructures of sintered diamond material.

HPHT Sintering of Fluorinated Crushed Nanodiamond and Micron Diamond with Aluminum A sample of crushed nanodiamond having a mean particle diameter of 90 nm was obtained from NanoDiamond Products, Ltd. The crushed nanodiamond was coated with fluorine by exposing the crushed nanodiamond to fluorine gas ($F_2$) at a temperature of 340° C. for 300 minutes. The fluorinated crushed nanodiamond was mechanically mixed (i.e., as dry powders) with diamond grit having particle diameters between about 3 μm and 6 μm, which was obtained from International Diamond Services, Inc., of Houston, Texas, and submicron aluminum powder having a mean particle diameter of 800 nm, which was obtained from US Research Nanomaterials, Inc. The mixture was approximately 29% fluorinated crushed nanodiamond, 67% micron diamond, and 4% aluminum. The mixture was subjected to HPHT sintering at a maximum pressure of 7.5 GPa and a maximum temperature of about 1,600° C., for about 40 seconds. The sample was tested by XRD to determine chemical composition, with the resulting XRD spectrum shown in FIG. 11. It appears that the aluminum interacted with both carbon and fluoride, because peaks corresponding to both $AlF_3$ and $Al_4C_3$ were detected by XRD. The microstructure of the polycrystalline diamond material was photographed by SEM, and is depicted in FIG. 12.

Elemental analysis of a sample of the polycrystalline diamond material of Example 5 showed that the aluminum was distributed throughout the polycrystalline diamond. Oxygen appeared primarily in regions having higher aluminum content, which suggests that inclusions of aluminum oxide may be present. It appears that aluminum fluoride and aluminum carbide fill the pores between diamond particles and adjacent the diamond-to-diamond grain boundaries.

Example 6

HPHT Sintering of Non-Fluorinated Crushed Nanodiamond and Micron Diamond without Aluminum A sample was prepared as in Example 5, but without fluorinating the crushed nanodiamond. The microstructure of the polycrystalline diamond material was photographed by SEM, and is depicted in FIG. 13.

Figure 13:
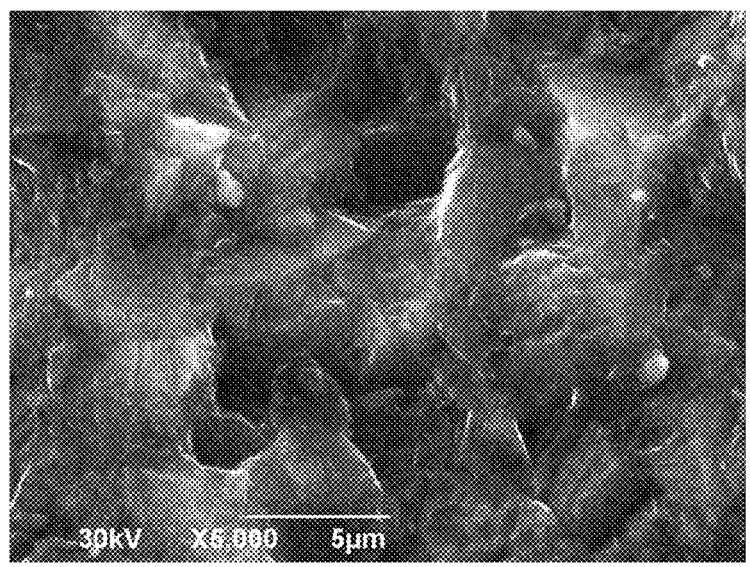

A comparison of the SEM images of FIGS. 12 and 13 shows that the addition of aluminum (FIG. 12) produces diamond particles that are better linked to each other than particles in an aluminum-free material (FIG. 13). Without being bound to any particular theory, it appears that during sintering, there is a partial intergrowth of micron-sized crystals due to the nanodiamond particles. The aluminum appears to promote bonding between diamond nanoparticles and micron diamond by reacting with the fluorine coating on the diamond nanoparticles, thus leaving an active site for carbon to bond.

The modulus of elasticity of the polycrystalline diamond in each of Examples 5 and 6 was determined to exceed 800 GPa, the limitation of the test equipment used. The polycrystalline diamond of each of Examples 5 and 6 were used in test trials cutting granite. The polycrystalline diamond of Example 5 exhibited significantly improved wear resistance in comparison to the polycrystalline diamond of Example 6.

Based on the foregoing examples, it appears that fluorinated nanodiamonds in mixtures with micron-sized diamonds and aluminum increases the modulus of elasticity of polycrystalline diamond formed in HPHT sintering from about 550-600 GPa (measured modulus of elasticity of PCD samples sintered from a mixture of non-fluorinated diamond and nanodiamond) to up to 800-850 GPa, and can cause growth and enlargement of diamond particles from nano- to up to micron sizes during HPHT sintering. Furthermore, adding aluminum to a mixture of micro-size diamond particles and fluorinated nanodiamonds does not decrease the modulus of elasticity of polycrystalline material after HPHT sintering; however, the wear resistance observed during cutting of granite is increased, apparently due to the formation of diamond-diamond bonds between the sintered micron-size particles.

Fluorination of the nanodiamond before sintering (Example 5) appears to produce a significant increase (by about 1.5 times) in the elasticity modulus of polycrystalline diamond as compared to polycrystalline diamond prepared from a mixture of non-fluorinated diamond and nanodiamond. Without being bound to any particular theory, this effect may at least in part be due to the possibility of formation of C—C bonds after detachment of covalently bound fluorine from the surface of the nanodiamond. Fluorine can reduce the inter-particle friction, leading to improved densification of mixtures during cold compression and rotation of particles during sintering.

Additional non-limiting example embodiments of the disclosure are described below.

Embodiment 1: A method of fabricating a diamond compact comprising functionalizing surfaces of diamond nanoparticles with fluorine, combining the functionalized diamond nanoparticles with a non-group-VIII metal to form a particle mixture, and subjecting the particle mixture to high pressure and high temperature (HPHT) conditions to form inter-granular bonds between the diamond nanoparticles.

Embodiment 2: The method of Embodiment 1, wherein functionalizing surfaces of diamond nanoparticles with fluorine comprises functionalizing surfaces of crushed diamond nanoparticles with fluorine.

Embodiment 3: The method of Embodiment 1 or Embodiment 2, further comprising including non-functionalized diamond grit in the particle mixture.

Embodiment 4: The method of any of Embodiments 1 through 3, wherein combining the functionalized diamond nanoparticles with a non-group-VIII metal comprises combining the functionalized diamond nanoparticles with at least one metal selected from the group consisting of aluminum, copper, silver, indium, zinc, lead, lithium, sodium, potassium, rubidium, cesium, magnesium, calcium, strontium, and barium.

Embodiment 5: The method of Embodiment 4, wherein combining the diamond nanoparticles with a non-group-VIII metal comprises combining the functionalized diamond nanoparticles with aluminum.

Embodiment 6: The method of any of Embodiments 1 through 5, wherein the particle mixture consists essentially of the functionalized diamond nanoparticles, the non-group-VIII metal, and non-functionalized diamond particles.

Embodiment 7: The method of any of Embodiments 1 through 6, wherein subjecting the mixture to HPHT conditions comprises heating the particle mixture to a temperature above a melting point of the non-group-VIII metal.

Embodiment 8: The method of any of Embodiments 1 through 7, wherein subjecting the mixture to HPHT conditions comprises heating the particle mixture to a temperature of at least about 1,400° C. and a maximum pressure of less than about 8.0 GPa.

Embodiment 9: The method of any of Embodiments 1 through 8, wherein subjecting the mixture to HPHT conditions comprises increasing an average particle size of the diamond nanoparticles.

Embodiment 10: The method of any of Embodiments 1 through 9, wherein combining the functionalized diamond nanoparticles with a non-group-VIII metal comprises forming a mixture in which the non-group-VIII metal comprises from about 0.1% to about 20.0% by weight of the mixture.

Embodiment 11: The method of any of Embodiments 1 through 10, wherein combining the functionalized diamond nanoparticles with a non-group-VIII metal comprises mixing the functionalized diamond nanoparticles and the non-group-VIII metal with a solvent and evaporating the solvent.

Embodiment 12: The method of any of Embodiments 1 through 11, wherein combining the functionalized diamond nanoparticles with a non-group-VIII metal comprises dry mixing of the functionalized diamond nanoparticles with a metal powder.

Embodiment 13: A method of forming a cutting element for an earth-boring tool, comprising functionalizing surfaces of diamond nanoparticles with fluorine, combining the functionalized diamond nanoparticles with a non-group-VIII metal to form a particle mixture, providing the particle mixture over a body, and subjecting the particle mixture and the body to high pressure and high temperature (HPHT) conditions to form inter-granular bonds between the diamond nanoparticles and secure the inter-granular bonded diamond nanoparticles to the body.

Embodiment 14: The method of Embodiment 13, wherein functionalizing surfaces of diamond nanoparticles with fluorine comprises functionalizing surfaces of crushed diamond nanoparticles with fluorine.

Embodiment 15: The method of Embodiment 13 or Embodiment 14, wherein subjecting the particle mixture and the body to HPHT conditions comprises heating the particle mixture to a temperature of at least about 1,400° C.

Embodiment 16: The method of any of Embodiments 13 through 15, wherein providing the particle mixture over a body comprises providing the particle mixture over a cutting element substrate.

Embodiment 17: The method of any of Embodiments 13 through 16, wherein subjecting the particle mixture and the body to HPHT conditions comprises forming a metal fluoride.

Embodiment 18: The method of Embodiment 17, wherein forming a metal fluoride comprises forming aluminum fluoride.

Embodiment 19: A cutting element for an earth-boring tool comprising a plurality of grains of diamond material; a plurality of diamond nanoparticles bonded to the plurality of grains of diamond material; and a non-group-VIII metal fluoride disposed within interstitial spaces between the grains of diamond material and the plurality of diamond nanoparticles. The cutting element is substantially free of a metal-solvent catalyst.

Embodiment 20: The cutting element of Embodiment 19, wherein the non-group-VIII metal fluoride comprises aluminum fluoride.

Embodiment 21: The cutting element of Embodiment 19 or Embodiment 20, wherein the plurality of diamond nanoparticles comprises crushed diamond nanoparticles.

Embodiment 22: The cutting element of any of Embodiments 19 through 21, wherein the plurality of diamond nanoparticles has a mean diameter from about 10 nm to about 1,000 nm.

Embodiment 23: The cutting element of any of Embodiments 19 through 22, wherein the non-group-VIII metal fluoride comprises at least one metal selected from the group consisting of fluorides of aluminum, copper, silver, indium, zinc, lead, lithium, sodium, potassium, rubidium, cesium, magnesium, calcium, strontium, and barium.

Embodiment 24: The cutting element of any of Embodiments 19 through 23, further comprising an oxide of a non-group-VIII metal.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various tool types and configurations.

What is claimed is:

1. A cutting element for an earth-boring tool, comprising:
   a substrate; and
   a polycrystalline diamond material directly attached to the substrate, the polycrystalline diamond material comprising:
      grains of diamond material;
      diamond nanoparticles bonded to the grains of diamond material; and
      a material disposed within and approximately filling all interstitial spaces between the grains of diamond material and the diamond nanoparticles, the material consisting of aluminum fluoride;
   wherein the polycrystalline diamond material is substantially free of a metal-solvent catalyst.

2. The cutting element of claim 1, wherein the diamond nanoparticles comprise crushed diamond nanoparticles.

3. The cutting element of claim 1, wherein the diamond nanoparticles have a mean diameter of about 90 nm.

4. The cutting element of claim 1, wherein a volume percentage of the grains of diamond material of the polycrystalline diamond material is at least 96%.

5. The cutting element of claim 1, wherein a modulus of elasticity of the polycrystalline diamond material is from 800 GPa to 850 GPa.

6. The cutting element of claim 1, wherein the substrate comprises metal-solvent catalyst.

7. The cutting element of claim 1, wherein the substrate comprises cobalt-cemented tungsten carbide.

8. An earth-boring tool, comprising:
   a body; and
   a cutting element secured to the body, the cutting element comprising a polycrystalline diamond material comprising:
      grains of diamond material;
      diamond nanoparticles bonded to the grains of diamond material; and
      a material disposed within and approximately filling all interstitial spaces between the grains of diamond material and the diamond nanoparticles, the material consisting of aluminum fluoride;
   wherein the polycrystalline diamond material is substantially free of a metal-solvent catalyst.

9. The earth-boring tool of claim 8, wherein the body comprises a bit body.

10. The earth-boring tool of claim 8, wherein the cutting element is secured within a pocket defined by the body.

11. The earth-boring tool of claim 8, wherein the cutting element is brazed to the body.

12. The earth-boring tool of claim 8, wherein a volume percentage of the grains of diamond material of the polycrystalline diamond material is at least 96%.

13. The earth-boring tool of claim 8, wherein a modulus of elasticity of the polycrystalline diamond material is from 800 GPa to 850 GPa.

14. A cutting element for an earth-boring tool, comprising:
- a substrate; and
- a polycrystalline diamond material directly attached to the substrate, the polycrystalline diamond material comprising:
  - grains of diamond material;
  - diamond nanoparticles bonded to the grains of diamond material;
  - a material disposed within and approximately filling all interstitial spaces between the grains of diamond material and the diamond nanoparticles, the material consisting of a non-group-VIII metal fluoride; and
  - an oxide of the non-group-VIII metal;
- wherein the polycrystalline diamond material is substantially free of a metal-solvent catalyst.

15. The cutting element of claim 14, wherein the non-group-VIII metal fluoride comprises aluminum fluoride.

16. The cutting element of claim 14, wherein the polycrystalline diamond material further comprises a carbide of the non-group-VIII metal.

* * * * *